United States Patent [19]

Nelson

[11] 4,453,101
[45] Jun. 5, 1984

[54] AMORTISSEUR BAR WITH IMPROVED INTERFACE BETWEEN FREE CONDUCTOR BARS AND AMORTISSEUR RING

[75] Inventor: Donald A. Nelson, Scotia, N.Y.

[73] Assignee: General Electric Company, Schenectady, N.Y.

[21] Appl. No.: 536,417

[22] Filed: Sep. 27, 1983

[51] Int. Cl.³ .............................................. H02K 3/06
[52] U.S. Cl. .................................... 310/211; 310/212; 310/261; 310/162; 310/197; 310/269
[58] Field of Search .............................. 310/162–164, 310/261, 269, 210–212, 179, 183, 196, 197

[56] References Cited

U.S. PATENT DOCUMENTS

| | | | |
|---|---|---|---|
| 2,499,390 | 3/1950 | Joy | 310/211 |
| 2,844,748 | 7/1958 | Hutchins | 310/269 X |
| 3,401,280 | 9/1968 | Lackey et al. | 310/211 X |
| 3,521,098 | 7/1970 | Jesse | 310/269 X |
| 3,902,087 | 8/1975 | Hakamada et al. | 310/211 |
| 4,249,098 | 2/1981 | Karlen et al. | 310/211 X |

*Primary Examiner*—Mark O. Budd
*Attorney, Agent, or Firm*—John F. Ahern

[57] ABSTRACT

An end portion of a free conductor bar of a pole-face winding for the rotor of a large dynamoelectric machine includes a flat at its radially outermost extremity. The end fits loosely within an oversized hole in an amortisseur ring. The presence of the flat displaces the contact line between the end portion and the hole from a thin bridge region of the amortisseur ring to two lines of contact displaced inward into the body of the material of the amortisseur ring. The reduced contact force and the repositioning of the contact location avoids cracking in the amortisseur rings of large dynamoelectric machines.

5 Claims, 5 Drawing Figures

U.S. Patent   Jun. 5, 1984   4,453,101
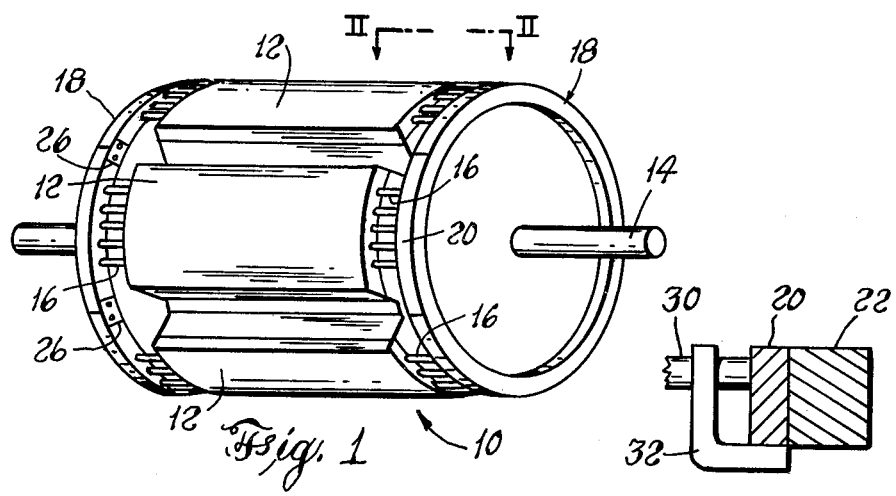
Fig. 1
Fig. 3
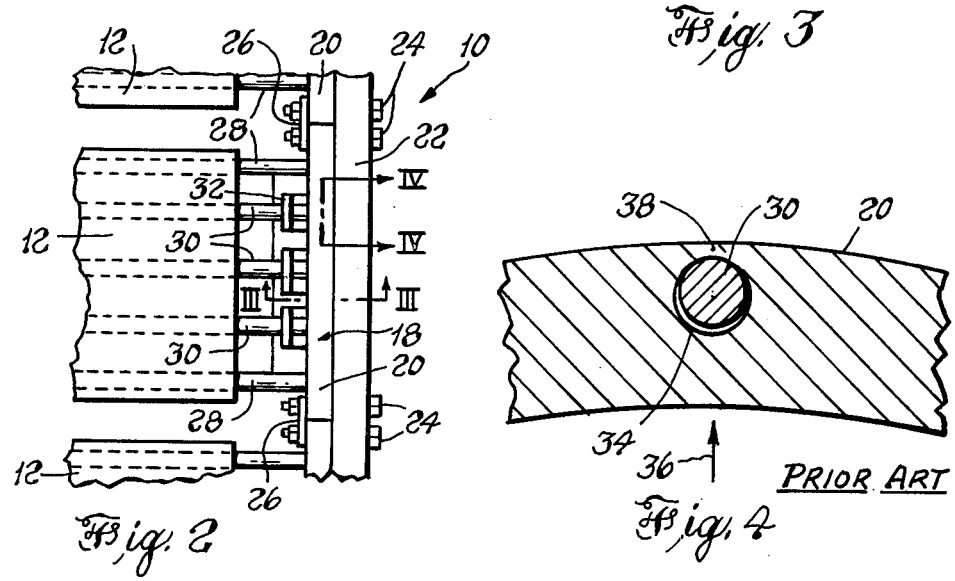
Fig. 2
Fig. 4  PRIOR ART
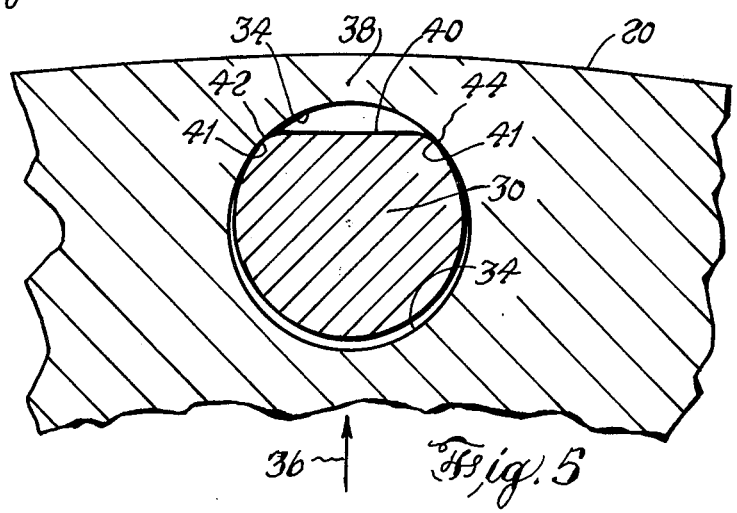
Fig. 5

AMORTISSEUR BAR WITH IMPROVED INTERFACE BETWEEN FREE CONDUCTOR BARS AND AMORTISSEUR RING

BACKGROUND OF THE INVENTION

The present invention relates to synchronous dynamolectric machines and, more particularly, to large synchronous dynamoelectric machines employing pole-face or damping windings shorted by amortisseur rings.

A synchronous dynamoelectric machine, either motor or generator, is capable of developing torque or generating electricity only when its rotor rotates at the same speed as the rotating magnetic field in its air gap with the phase angle of the magnetic field of the rotor separated from the phase angle of the rotating electrical field by less than about 180 degrees and preferably by less than 90 degrees. This speed is called the synchronous speed. The exact value of the synchronous speed depends on the line frequency of the AC supply and on the number of poles in the machine. In a two-pole machine operating with 60 Hz power, for example, the synchronous speed is 3600 RPM.

In order to accelerate a motor rotor from a standstill to synchronous speed it is customary in one type construction to embed amortisseur bars, or pole-face windings, in the pole faces of the rotor with shorting rings or amortisseur rings or segments thereof shorting the ends of the bars together. When the stator is excited with AC, the amortisseur windings interact with the rotating magnetic field in the same fashion as an induction motor to accelerate the rotor to a speed close to synchronous speed. The rotor poles are then excited with DC and, if the load is not too great, the rotor is pulled into synchronous rotation with the rotating magnetic field. As long as synchronous speed is maintained, the amortisseur bars remain substantially quiescent since there is, by definition, no sustained rotor slip when the rotor rotates at synchronous speed and there is thus little or no current in the amortisseur bars.

For manufacturing convenience, the amortisseur rings are made in sectors, one sector at each end being associated with one of the motor poles. That is, for a six-pole motor, the amortisseur rings at each end are made in six sectors which are joined together to form the completed amortisseur rings during final assembly of the rotor. During the relatively short period while the rotor is being started, a very high value of current flows in the amortisseur bars. This produces substantial heating and thermal expansion of the amortisseur bars. Once synchronous speed is attained, the heating ceases and the amortisseur bars begin to cool. It is known that the heating of amortisseur bars is not uniform. The bar at the leading edge of each pole piece becomes much hotter than the conductor bars further back from the leading edge.

In order to keep the differences in expansion of the amortisseur bars due to differential heating from generating excessive forces in the amortisseur rings it is conventional to rigidly affix only the bars at the extreme ends of each amortisseur sector in holes in the respective sectors and to leave the ends of the conductor bars between these end conductor bars free to move axially within loosely fitting holes in the sectors. The fixed conductor bars are mechanically and electrically connected to their sectors by brazing or equivalent means. Current is conducted between the free conductor bars and their sectors by flexible conducting braid.

As the sizes of synchronous motors has increased beyond about 20,000 horsepower, there is a tendency, under certain heavy-duty cycles, for cracks to develop in the outer surface of the amortisseur rings radially outward from the loosely fitting holes aligned with the axis of the loosely fitting holes. This type of cracking is not observed adjacent the fixed conductor bars. Although I do not intend to limit the scope of my invention to any particular causal theory, it is believed that a combination of heating and centrifugal force contributes to the development of such cracking.

Centrifugal force urges the ends of the amortisseur bars outward into axially directed lines of contact with the radially outward extremity of the loosely fitting holes in the amortisseur ring. It is believed that, during starting, a substantial current flows between the end of an amortisseur bar and the amortisseur ring through the poorly conducting line of contact between them. This current flow generates heat which, combined with the heat generated by starting current in the amortisseur bar and the urging of centrifugal force, exceeds the ability of the thin section of the amortisseur ring between the loosely fitting hole and its radially outer surface to withstand. This heating and application of centrifugal force is cyclical, occurring each time the motor is started, and is usually immediately followed by cooling. This thermal and stress cycling appears to be the root of the observed cracking.

The occurrence of cracking in the outer extremities of the amortisseur rings adjacent the free amortisseur bars does not constitute a major safety or operational hazard since the centers of the conductor bars are usually firmly secured in the pole pieces and the most severe of the observed cracks are quite narrow compared to the diameters of the conductor bars. Such cracking cannot, however, be tolerated, since any failure in a dynamoelectric machine may lead to other unforeseeable effects which could eventually damage the machine or cause a serious failure.

Although the above description of the background and the ensuing description of the present invention are directed concretely toward use in amortisseur windings of a motor, the disclosure herein applies equally to amortisseur windings of generators.

OBJECTS AND SUMMARY OF THE INVENTION

Accordingly, it is an object of the invention to provide means for preventing cracking of amortisseur rings adjacent the ends of free amortisseur bars in synchronous dynamoelectric machines.

It is further object of the invention to provide an interface between an end of a free ammortisseur bar of a pole-face winding and a hole in an amortisseur ring which transfers contact therebetween to two lines of contact displaced radially inward from a radially outward extremity of the free amortisseur bar.

According to an embodiment of the invention, there is provided a rotor for a dynamoelectric machine comprising a plurality of pole pieces in the rotor, each of the pole pieces including a plurality of amortisseur bars passing therethrough and extending therebeyond, respective segments of amortisseur rings electrically joining together all ends of the amortisseur bars at each end of the pole piece, at least one of the amortisseur bars being a free bar having an end disposed within a loosely fitting hole in at least one end segment and free to move along an axis of the amortisseur bar within the loosely fitting hole and having a portion on the end of the amortisseur bar aligned with a radially outermost portion of the loosely fitting hole modified to provide a substantially flat surface thereat whereby contact between the end and the loosely fitting hole is prevented at the radially outermost portion.

According to a feature of the invention, there is provided a pole piece for a dynamoelectric machine of the type including an amortisseur winding associated therewith, comprising the pole-face winding including a plurality of amortisseur bars embedded in the pole piece, first and second ends of each of the plurality of conductor bars extending beyond the pole piece at first and second ends thereof, first and second segments of an amortisseur ring, at least a first end of at least one of the plurality of conductor bars being freely fitted within a loosely fitted hole in the first segment, a modified flat surface portion on the first end of the at least one of the conductor bars and the flat being disposed in a radially outward direction in a direction in which centrifugal force urges the first end during operation of the dynamoelectric machine whereby contacts between the first end and the loosely fitting hole adjacent portion of said amortisseur ring are positioned away from a radially outermost portion of said amortisseur ring segment.

Briefly stated, the present invention provides at least one end portion of a free amortisseur bar of a rotor of a large dynamoelectric machine having a flat at its radially outermost extremity. The end fits loosely within an oversized hole in an associated amortisseur ring. The presence of the flat displaces the contact line between the end portion and the amortisseur rings from a thin bridge region of the amortisseur ring to two lines of contact displaced circumferentially away from the thin bridge region to thicker portions of the amortisseur ring adjacent the hole therein. The reduced contact force and the repositioning of the contact location avoids cracking in the amortisseur rings of large dynamoelectric machines.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a simplified perspective view of a rotor of a synchronous machine to which the present invention may be applied.

FIG. 2 is a view taken in the direction of section line II—II in FIG. 1.

FIG. 3 is a cross section taken along section line III—III in FIG. 2.

FIG. 4 is a cross section taken along section line IV—IV of FIG. 2 showing a portion of an amortisseur segment and a conductor bar according to the prior art.

FIG. 5 is a cross section corresponding to FIG. 4 according to an embodiment of the present invention.

DETAILED DESCRIPTION OF THE PREFERRED EMBODIMENT

Referring now to FIG. 1, there is shown, generally at 10, a rotor to which the present invention may be applied. Rotor 10 includes only those details necessary for the present disclosure. A plurality of pole pieces 12 are disposed about a shaft 14. Each pole piece 12 includes a plurality of amortisseur bars 16 passing axially therethrough and extending a substantial distance beyond its ends. An amortisseur ring 18 at each end of rotor 10 short circuits all of conductor bars 16 together as is conventional to provide starting torque for a motor or damping torque for a generator. Although five conductor bars 16 are shown in each pole piece 12, more or less conductor bars 16 may be employed.

Although not a part of this invention, it should be appreciated that each pole piece 12 is the external end of a stack of thin laminations having a somewhat narrower circumferential width than the exposed pole and terminating radially inwardly in at least one, but preferably at least two, "T" shaped key members which, when assembled to form the stack, are inserted axially into machined keyways in what is normally a flat surface of the rotor shaft. The stack is then fixed in place by inserting a pair of thin wedges in opposite ends of the space between the lower flat of the stack keys and the flat of the keyways. These oppositely inserted axial wedges overlap and firmly affix the stack of laminations to the rotor shaft. As many of such stacks are affixed to the rotor shaft as the number of poles which the rotor is designed to have.

Each stack of laminations is then wound around its central portion with insulated electrical conductor in wire, tape or bar form to form a rotor coil. Each coil then has a pole at the surface of pole pieces 12. The number of poles and the speed of rotation determine the frequency of the dynamoelectric machines operating (or generated) voltage.

Referring now also to FIG. 2, for manufcturing convenience, amortisseur rings 18 are divided into segments 20 corresponding to pole pieces 12. Each segment 20 is made of a material having high electrical conductivity such as, for example copper or brass. In a six pole rotor 10, amortisseur rings 18 are divided into six segments 20 which are bolted, or otherwise mechanically and electrically connected together end to end during final assembly of rotor 10. As is conventional in large rotors 10, amortisseur ring 18 may be reinforced with a support ring 22 of high-strength material such as, for example, steel. Segments 20 are affixed to support ring 22 by any convenient means such as by bolts 24. In order to electrically interconnect adjacent segments 20, a fish plate 26 spans the gap therebetween and is secured by the same bolts 24 used for affixing segments 20 to support ring 22.

Amortisseur conductor bars 16 may be of two types, namely fixed bars 28 and free bars 30. Fixed bars 28 are located at each edge of pole piece 12 and are rigidly mechanically and electrically affixed to segments 20 by, for example, brazing. Free bars 30, on the contrary, are loosely fitted into oversized holes in segments 20 to thereby remain free to displace axially in response to temperature changes. Referring now also to FIG. 3, a flexible conductor 32 is electrically connected between free amortisseur bar 30 and support ring 22 to provide electrical continuity therebetween. Flexible conductor 32 may be, for example, a conventional flexible, highly conductive braided metallic material.

Referring now to FIG. 4, a cross section of a free amortisseur bar 30 according to the prior art is shown loosely fitted within an oversized hole 34. Although dimensions will vary between different machines, in the illustrative embodiment of the invention, hole 34 is about 1/32 inch larger in diameter than free conductor bar 30, which has an end diameter of 1.5 inches. Centrifugal force acts in the direction indicated by an arrow 36 to urge free amortisseur bar 30 into contact with hole 34 along a line of contact at a bridge region 38, which is the thinnest part of segment 20. Large contact forces can thus be developed in bridge region 38 and any current flowing between segment 20 and free conductor bar 30 in this vicinity also flows in bridge region 38 to produce localized heating therein. Bridge region 38 is the thinnest section and presents the longest heat flow path into the body of segment 20. Thus, heat injected into segment 20 at bridge region 38 is more difficult to reject than heat injected elsewhere around the perimeter of hole 34. When cracks develop in segment 20, they are observed to develop in bridge region 38.

Referring now to FIG. 5, there is shown a free amortisseur conductor bar 30 according to an embodiment of the present invention. Free conductor bar 30 includes a chorded portion, or flat 40, disposed in its radially outermost surface. Additionally the intersections of the chorded or flat section 40 with the remainder of the cylindrical amortisseur bar end is provided with an outer curvature or fillet 41, in the instance of the example given herein, having a radius of curvature of ¼ inch. Flat 40 moves the former single line of contact at bridge region 38 to two lines of contact, 42 and 44, displaced radially inward and tangentially from bridge region 38. Several desirable effects are achieved by this change, namely (1) contact forces are divided between two lines of contact 42 and 44 instead of being concentrated in a single point of contact thus substantially reducing the stress level in segment 20, (2) lines of contact 42 and 44 are displaced away from bridge region 38 which is the thinnest, and consequently the weakest, section of segment 20 to regions much nearer the ends of the bridge region 38, which may be considered as a mechanical truss, (3) the source of heat is moved away from the thinnest section at bridge region 38, and (4) lines of contact 42 and 44 are located closer to the main body of material of segment 20 thereby offering a shorter heat flow path for discharging heat into the body of material of segment 20. Additionally, the curvature added to the tangential lines of contact 42 and 44 greatly accentuate these advantages.

One potential application of this invention is a 25,000 HP, 6-pole synchronous motor which upon examination showed the existence of cracks in the "bridge" region of the amortisseur ring. Although a retrofit to incorporate the modification of the subject invention has not been performed on this machine to date, extensive calculations have been made to determine the advantage which would be gained by such application. The geometry of the machine in question is as follows. The "free" amortisseur bars have a uniform diameter of 2.125 inches and are loosely fitted at either end through holes in the end rings having a diameter of 2.155 inches. The amortisseur ring has dimensions of 59.75 inches outside diameter and is an annular member with dimensions of 4 inches in the radial direction and 1.5 inches in the axial dimensions. The bar is made of brass. The holes for retaining the free amortisseur bar ends are offset from the centerline of the ring truss so that the dimension between the radially outer edge of the holes is spaced from the outside edge of the amortisseur ring by 0.125 inch. The assumed application of the present invention to this machine would be to machine a "flat" at the respective ends of the bars where they would pass through the holes in the amortisseur rings. Such machined flats would constitute a chorded segment included in 80° or arc from the center of the bars and would have smooth curvatures at the intersection of the flat with the original cylindrical surface of the bar which would be achieved by machining such intersections to a curvature having 0.250 radius of curvature. This would ensure tangential mating of the edges 42 and 44 of the flat on the amortisseur bar ends with the interior surface of the amortisseur ring holes.

Treating the "bridge" section of the amortisseur ring in accordance with classical beam theory, I have calculated that under normal starting conditions the maximum stress on the "bridge" sections of the amortisseur ring due to the mechanical change only would be reduced from approximately 73,000 psi to about 3500 psi. This reduction would be in addition to any reduction in the adverse effects of heating of the "bridge" section due to the previously described resistive heating at the juncture of the amortisseur bar with the amortisseur ring.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

Thus, for example, amortisseur bars 16 need not be retained in pole pieces 12 by passing through holes in the stack of laminations. They could be located in recesses in the outer periphery of the pole pieces resulting from notches in each lamination. Such recessed bars could be held in place by circumferential rings of a non-ferromagnetic material such as epoxy impregnated fiberglass. Yet another modification would contemplate dispensing with a separate amortisseur ring and using the outermost one or a group of outermost laminations to serve as the amortisseur ring. Such modifications are within the scope of the claimed invention.

What is claimed is:

1. A rotor for a dynamoelectric machine comprising:
   a plurality of pole pieces in said rotor;
   each of said pole pieces including a plurality of amortisseur conductor bars adjacent the radially exterior surface thereof and affixed thereto and extending therebeyond;
   first and second segments of an amortisseur ring electrically joining together all ends of said conductor bars at respective ends of said pole piece;
   at least one of said conductor bars being a free conductor bar having an end disposed within a loosely fitting hole in said first segment and free to displace along an axis of said conductor bar within said loosely fitting hole; and
   an end adjacent portion at said free conductor bar at which an outwardly depending portion thereof is removed to prevent the exact radially outer portions of ends of said bars from contact in a stress-bearing relation upon the portion of said ring exactly outward of said bars.

2. A rotor according to claim 1 wherein said loosely fitting hole is cylindrical, said end is cylindrical and said portion of said bar ends where material is removed presents a substantially flat surface.

3. A pole piece for a dynamoelectric machine of the type including a pole-face winding associated therewith, comprising:
   said pole-face winding including a plurality of amortisseur conductor bars embedded in said pole piece;

first and second ends of each of said plurality of conductor bars extending beyond said pole piece at first and second ends thereof;

first and second segments of an amortisseur ring;

a first end of at least one of said plurality of conductor bars being freely fitted within a loosely fitted hole in said first segment;

a flat on said first end of said at least one of said conductor bars; and said flat being disposed in a radially outward direction in a direction in which centrifugal force urges said first end during operation of said dynamoelectric machine whereby a contact between said first end and said loosely fitting hole is positioned away from a radially outermost portion of said loosely fitting hole.

4. The pole piece of claim 3 in which the respective junctures of said flat portion of said bar end regions with the remainder of the cylindrical portion of said bar end regions are curved to provide tangential contact of an extended area as compared with the area of tangential contact if said rounded ended flats were not provided at said bar ends, thereby to reduce unit stress at intersections of said bar ends with said hole-adjacent portions of said rings, both by providing a pair of contact regions as well as by increasing the stress-bearing areas thereof.

5. The pole piece of claim 4 wherein the stress-bearing capacity of the hole-adjacent portions of said rings is increased over that of said rings in the absence of said flats due to the increased radial thickness of said rings at said pair of contacting regions.

* * * * *